Nov. 20, 1945.  H. C. JENKS  2,389,364
REGULATING SYSTEM
Filed Nov. 1, 1944
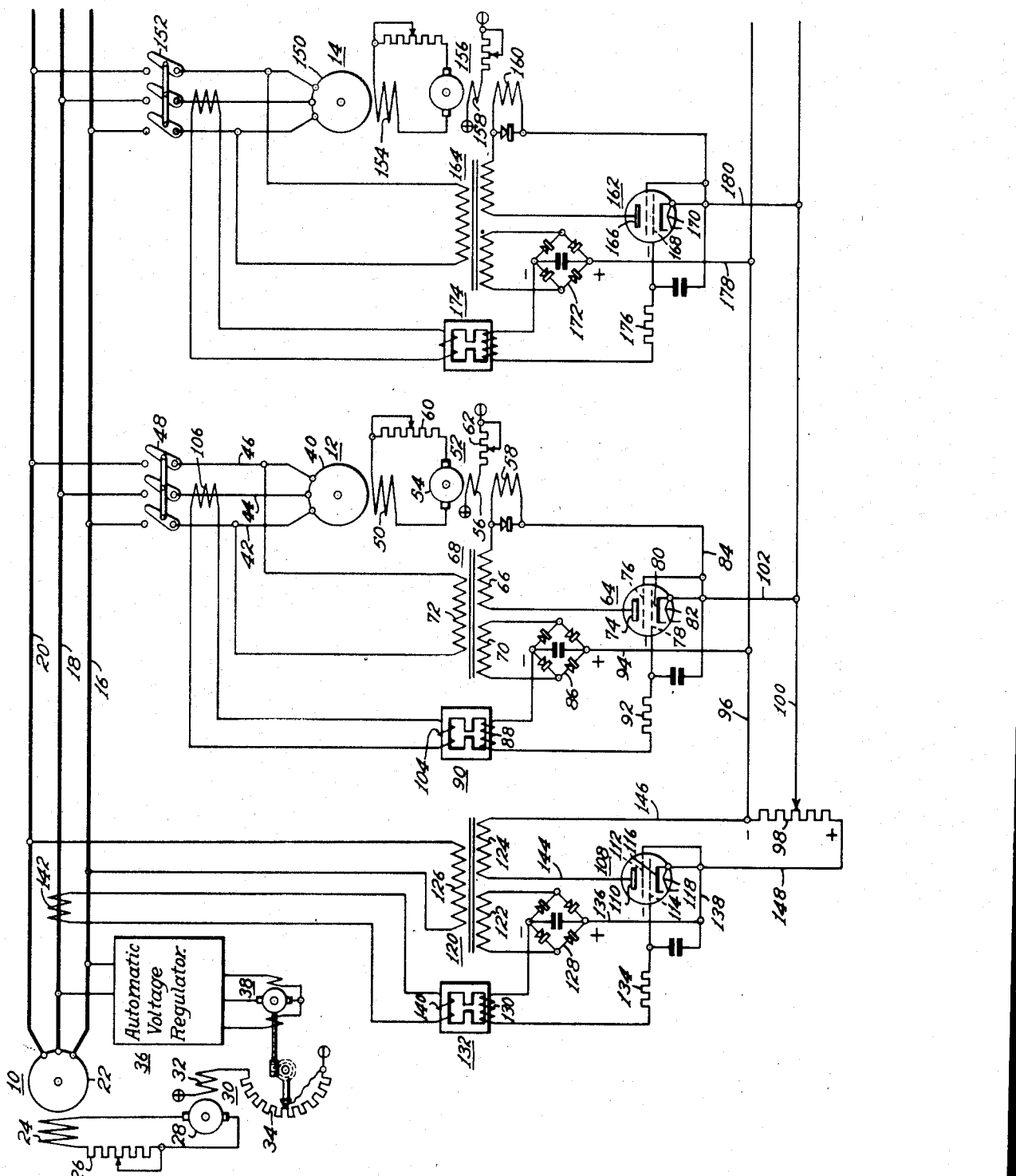
WITNESSES:
INVENTOR
Harold C. Jenks.
BY
ATTORNEY Patented Nov. 20, 1945

2,389,364

UNITED STATES PATENT OFFICE 2,389,364

REGULATING SYSTEM

Harold C. Jenks, Cincinnati, Ohio, assignor to Westinghouse Electric Corporation, East Pittsburgh, Pa., a corporation of Pennsylvania Application November 1, 1944, Serial No. 561,371

6 Claims. (Cl. 171—119)

This invention relates to regulating systems and in particular to regulating systems for maintaining balanced output between parallel connected generators.

Heretofore where alternating-current generators have been connected in parallel for supplying a load each of the generators have generally been provided with an exciter for controlling the excitation of the associated generator, the field of the individual exciter being controlled by a suitable voltage regulator. Thus as many regulators have been required as there are generators. In addition, cross current compensating devices have been employed in conjunction with the voltage regulators in an effort to obtain a uniform distribution of the load between the generators. Such systems and apparatus are expensive, cumbersome and complicated, and require careful supervision to maintain them efficient in operation.

An object of this invention is to provide, in a system of parallel connected generators, for controlling the excitation of one of the generators in response to the power factor of the generators to be balanced, to maintain a balanced output of the parallel connected generators.

Another object of this invention is to provide a system for the parallel operation of generators in which only one voltage regulator is utilized to control the excitation of one of the generators, the excitation of the other generator being controlled in response to the power factors of the output of the generators.

Other objects of this invention will become apparent from the following description when taken in conjunction with the accompanying drawing, the single figure of which is a diagrammatic view of apparatus and circuits embodying the teachings of this invention.

Referring to the drawing, there is illustrated a plurality of generators 10, 12 and 14 disposed to be connected to load conductors 16, 18 and 20 for parallel operation for supplying a load (not shown). The generator 10 comprises the armature windings 22 connected directly to the load conductors 16, 18 and 20 and the field windings 24 connected to be energized to control the excitation and consequently the output of the generator 10. The field winding 24 of generator 10 is connected through an adjustable resistor 26 across the armature windings 28 of an exciter 30.

As illustrated, the exciter 30 is provided with field windings 32 disposed to be connected through a field rheostat 34 to a pilot exciter (not shown) or any other suitable constant source of power supply represented by the positive and negative terminals.

In order to control the energization of field windings 32 of the exciter 30 and consequently control the excitation of the generator 10, a suitable voltage regulator 36 is connected to be responsive to the voltage across the generator 10 to control the operation of a reversible motor 38 disposed to operate the field rheostat 34. As will be understood, the particular type of voltage regulator is relatively unimportant and as many different types are well known, it is within the scope of this invention to utilize any of the standard voltage regulators.

With the voltage regulator 36 connected in the manner described, as the voltage across conductors 16 and 18 increases, the regulator 36 functions to so energize the reversible motor 38 that it operates to connect more of the field rheostat 34 in circuit with the field windings 32, thereby lowering the output of exciter 30 to decrease the excitation of the generator 10. Conversely, as the voltage across conductors 16 and 18 decreases, the regulator functions to effect an operation of the reversible motor 38 to decrease the number of sections of the field rheostat 34 in circuit with the field windings 32 to effect an increase in the output of the exciter 30 and consequently increase the excitation of the generator 10.

The generator 12 comprises armature windings 40 disposed to be connected by conductors 42, 44 and 46 through the three-pole switch 48 to the load conductors 16, 18 and 20, respectively, and field windings 50 disposed to be energized for controlling the excitation of the generator 12. An exciter 52 comprising armature windings 54 and a pair of field windings 56 and 58 is utilized for controlling the energization of the field windings 50, the armature windings 54 of the exciter 52 being connected through an adjustable resistor 60 across the field windings 50. The field windings 56 of exciter 52 are connected through an adjustable resistor 62 across a pilot exciter (not shown) or other constant source of supply, indicated by the positive and negative terminals and, where feasible, may be connected to the same constant source of supply as the field windings 32 of the exciter 30.

In order to control the energization of the field windings 58 of exciter 52, the windings 58 are disposed to be connected through an electric valve discharge device 64 to the secondary windings 66 of a transformer 68. The transformer 68 is also provided with other secondary windings 70 and primary windings 72, the primary windings being connected across conductors 42 and 46 supplied by the generator 12.

The electric valve 64 comprises an anode 74, a screen grid 76, a biasing grid 78, a heater 80 and a cathode 82. The electric valve 64 has the characteristics that when used on alternating-current voltage, if rendered conducting by a grid impulse, it will conduct current for the remaining portion of the positive half-cycle of the voltage wave but will be rendered non-conducting when the voltage decreases to the arc drop value of the valve and will not be re-established during the negative half-cycle of that voltage wave.

As illustrated, the secondary windings 66 of transformer 68 for supplying current to the field windings 58 of the exciter 52 have one of their terminals connected to the anode 74 of valve 64, the other terminal of the secondary windings 66 being connected through the field windings 58 and conductor 84 to the cathode 82 of electric valve 64. The flow of current through the field windings 58 energizes the field windings so that the effect of the field windings 58 is additive to that of the field windings 56 when both of the field windings are energized.

In order to provide a negative bias on the grid 78 of electric valve 64, the secondary windings 70 of the transformer 68 are connected across the input terminals of a rectifying bridge circuit 86, one of the output terminals of which is connected through the secondary windings 88 of an impulse transformer 90 and a resistor 92 to the grid 78, the other output terminal of the rectifying bridge circuit 86 being connected by conductors 94 and 96 through a part of a resistor 98 and conductors 100 and 102 to the cathode 82 of the valve 64.

The impulse transformer 90 is provided for controlling the firing of the valve 64 by the power factor angle of the current supplied by the generator 12. As illustrated, the primary windings 104 of the impulse transformer 90 are connected to a current transformer 106 which is disposed in inductive relation with the conductor 44 from the generator 12. The impulse transformer 90 is of a type well known to the industry, the leg of the magnetic core upon which the secondary windings 88 are wound being so designed that it will saturate very early in the current cycle and as a result of the rapid saturation will provide a peaked impulse of considerable magnitude. Thus although the valve 64 is normally maintained conducting by the negative bias applied thereto, when the impulse transformer 90 impresses its peaked voltage on the grid biasing circuit, the grid 78 is rendered less negative or more positive to cut the critical grid voltage of the valve 64 and render the valve conductive.

The phase position of the impulse impressed on the grid circuit by the impulse transformer 90 will be dependent upon the angle of the current of the output of the generator 12. Thus, at unity power factor, the impulse comes at the peak of the positive half-cycle of the voltage wave, whereas for a leading power factor, the impulse comes at an earlier time in the positive half-cycle of the voltage wave and for a lagging power factor the impulse comes later in the positive half-cycle of the voltage wave. Thus with the field windings 58 connected across the anode 74 and the cathode 82 of electric valve 64, it is apparent that the current flowing through the windings 58 is dependent upon the firing of the valve 64, the conductivity of which is controlled through the impulse transformer 90 in response to the power factor of the output of generator 12.

With the circuit as just described, it is apparent that when the valve 64 is conducting the windings 58 are energized to so excite the exciter 54 as to increase the output thereof and so increase the excitation of the generator 12 that its power factor tends to shift toward a lagging power factor. In order to limit the operation of the valve 64 so as to control the power factor of the output of the generator 12 and maintain it in a balanced relation with respect to that of the generator 10, another electric valve 108 is disposed to control the bias of the grid 78 of the electric valve 64 in response to the power factor of the output of generator 10. The valve 108 is similar to the valve 64 having the same characteristics and being provided with an anode 110, a screen grid 112, a biasing grid 114, a heater 116 and a cathode 118.

In order to provide a negative bias for the grid 114 of valve 108, a transformer 120 having secondary windings 122 and 124 and primary windings 126 is provided, the primary windings 126 being connected across conductors 16 and 20 of the load circuit. As illustrated, the secondary windings 122 of the transformer 120 are connected across the input terminals of a rectifying bridge circuit 128, one of the output terminals of which is connected through the secondary windings 130 of an impulse transformer 132 and a resistor 134 to the grid 114, the other terminal of the rectifying bridge circuit 128 being connected by conductors 136 and 138 to the cathode 118 of the valve 108.

The impulse transformer 132 is similar to the impulse transformer 90 having primary windings 140 connected across a current transformer 142 disposed in inductive relation with respect to load conductor 18, whereby the transformer 132 impresses an impulse on the grid biasing circuit in response to the power factor of the current in the load conductors. The function of the impulse transformer 132 is the same as that of impulse transformer 90 described hereinbefore and it is thus apparent that the firing of the valve 108 is dependent upon the power factor of the output of generator 10 and the load conductors 16, 18 and 20.

The anode 110 of the valve 108 is connected by conductor 144 to a terminal of the secondary windings 124 of transformer 120, the other terminal of secondary windings 124 being connected by conductor 146 through resistor 98 and conductor 148 to the cathode 118 of the valve 108. Thus the output of the valve 108 impresses a voltage on the grid biasing circuit of valve 64 which by reason of the interconnected resistor 98 which is additive to the normal negative bias to definitely render the bias on the grid 78 negative. The negative bias impressed on the grid circuit of the valve 64 is thus directly dependent upon the power factor of the output of the generator 10 whereby the firing of the valve 64 is determined by the power factor of the outputs of generators 10 and 12.

Because of the characteristics of the valves 64 and 108, if valve 64 is rendered conductive by the action of the impulse transformer 88 in response to the power factor of the output of the generator 12 before valve 108 is rendered conducting, the valve 64 will remain conductive for the remaining portion of the positive half-cycle of the voltage wave and the firing of the valve 108 will have no effect on the valve 64. However, if by reason of the power factor of the output of the generator 10 or by reason of a change in the power factor of the output of generator 12, the impulse from the impulse transformer 90 should come later in the voltage wave than the impulse from the transformer 132, then the negative bias impressed on the grid circuit of valve 64 by reason of the valve 108 being rendered conductive, is sufficient to maintain the valve 64 non-conducting whereby current ceases to flow in the field windings 58. Under such conditions, the excitation of the exciter 52 is dependent upon the energization of the field windings 56 with the result that the output of the exciter 52 is reduced to lower the excitation of the generator 12 and cause the power factor of the output of generator 12 to tend to be more leading.

The generator 14 is similar to the generator 12 having its armature windings 150 connected by the three-pole switch 152 to load conductors 16, 18 and 20, the field windings 154 of the generator 150 being disposed to be energized by the output of an exciter 156. The exciter 156 is provided with field windings 158 and 160 which correspond to the field windings 56 and 58 of exciter 52.

The flow of current through the field windings 160 is controlled by a valve 162 connected in circuit relation with a transformer 164. The valve 162 is identical to valves 64 and 108 and has the same characteristics, being provided with an anode 166, a biasing grid 168 and a cathode 170.

In order to control the negative bias on the grid 168, a rectifying bridge circuit 172 is connected to one of the secondary windings of the transformer 164 and has one of its output terminals connected through the secondary winding of an impulse transformer 174 through a resistor 176 to the grid 168, the other terminal being connected by conductors 178 and 96 through a part of the resistor 98 and conductors 100 and 180 to the cathode 170.

Thus since the field windings 160 of the exciter 156 are connected across the anode 166 and the cathode 170 of the valve 162, the current flow through the field windings 160 is dependent upon the cooperative firing of the valves 162 and 108 in the same manner as the cooperative firing of the valves 64 and 108 for controlling the flow of current through the field winding 58 of exciter 52. In both cases, the resistor 98 functions when the valve 108 is conducting to impress a negative bias on the grid circuit of the valves associated with generators 12 and 14 to render the valves 64 and 162, respectively, non-conducting when the valve 108 is rendered conducting ahead of the valves 64 and 162.

In operation, where it is desired to maintain a balanced output between the generators 10, 12 and 14, the output of the generator 10 is first adjusted to a desired value and by reason of the operation of the automatic voltage regulator 36, the output of generator 10 is maintained substantially constant. When the voltage of the generator 12 is brought up to the predetermined voltage of the generator 10 by adjusting resistors 60 and 62 connected in the field circuits of the exciter 52 and the generator 12, respectively, the switch 48 is actuated to a circuit closing position to connect the generator 12 in parallel with the generator 10. Similarly, generator 14 is connected in parallel with the generator 10 after the voltage on the generator 14 has been adjusted by adjusting the resistors in the field circuits of the exciter 156 and the generator 14. Under these conditions, each of the generators 10, 12 and 14 are operating in a balanced relation as a result of the manual adjustment of the resistors.

In order that the regulating system of this invention may function automatically to maintain the output of the generators 12 and 14 balanced with respect to that of the generator 10, the resistor 62 in circuit with the field winding 56 of the exciter 52 is manually adjusted to decrease the flow of current therein to a value below that value at which the regulating systems begin to function to energize the field windings 58 of the exciter 52 to control the power factor of the output of the generator 12. Similar adjustments are made in the resistor in the field circuit of the exciter 156 of generator 14 until the regulating system functions to control the energization of the field winding 160 to control the output of the exciter 156 and consequently the excitation of the generator 14.

Assuming that the generator 10 is so regulated that its output is at unity power factor and that the generators 12 and 14 are connected in parallel with the generator 10 as previously described, if for any reason the power factor of the generator 12 should tend toward a leading value away from the balanced power factor at unity value, then the impulse transformer 90 functions to impress a peaked voltage on the grid circuit of the valve 64 to render the valve 64 conducting. When the valve 64 is rendered conducting, current flows through the circuit extending from the anode 74 through the secondary winding 66 of transformer 68, field winding 58 and conductor 84 to the cathode 82 of the valve 64 to so energize the field windings 58 that the output of the exciter 52 is increased to effect an increase in the excitation of the generator 12 and cause its power factor to shift to a less leading or to a lagging value.

When the power factor of the output of generator 12 is thus shifted beyond unity power factor to a lagging value, the valve 108 functions to prevent further operation of the valve 64 for forcing the excitation of the generator 12. This is because with the power factor of the output of generator 10 at unity value, the impulse transformer 132 impresses a peaked voltage on the grid circuit of valve 108 at a point on the positive half-cycle of the voltage wave represented by unity power factor so that the valve 108 becomes conducting at that point. When the valve 108 is rendered conducting, current flows in the circuit which extends from the anode 110 through conductor 144, secondary windings 124 of transformer 120, conductor 146, resistor 98 and conductor 148 to the cathode 118 of the valve 108. The flow of current through the resistor 98 impresses a potential on the grid circuit of the valve 64 which is additive to the normal negative bias thereof, whereby the grid 78 of valve 64 is positively rendered negative to prevent the valve 64 from conducting.

By thus deenergizing the field windings 58, only the field windings 56 of the exciter 52 function to energize the exciter 52 whereby the output of the exciter 52 is so decreased as to decrease the excitation of the generator 12 as to cause its power factor to shift to a more leading value. As will be apparent, the cooperative firing of the valves 64 and 108 will maintain the power factor of the output of generator 12 balanced with respect to the power factor of the output of generator 10.

The generator 14 will be controlled in a manner identical to that of generator 12, the operation of the regulating systems being identical in that the valves 162 and 108 cooperate in the manner described with respect to valves 64 and 108 whereby the excitation of the exciter 156 is so controlled as to control the excitation of the generator 14 to maintain the power factor of the output of generator 14 balanced with respect to the output of generator 10. It is believed that further description of the operation of the system with respect to generator 14 is unnecessary, reference having been made to generator 14 as illustrative that the output of more than two generators can be maintained in a balanced condition by the regulating system of this invention.

By utilizing the system of this invention, it is apparent that only one automatic voltage regulator is necessary regardless of the number of generators connected in parallel and that the apparatus necessary for parallel operation of the generators is thus greatly simplified. The regulating system of this invention automatically provides cross current compensation and as the apparatus employed is of standard construction, the systems can readily be duplicated. After the generators have once been connected in their parallel relation, little maintenance is required as the system automatically corrects for any tendency to vary from an unbalanced condition.

While this invention has been described with reference to a particular embodiment thereof, it is, of course, to be understood that it is not to be limited thereto except insofar as is necessitated by the scope of the appended claims.

I claim as my invention:

1. A system for regulating the operation of parallel connected alternating-current generators, comprising, in combination, an exciter disposed for operation to control the excitation of a first one of the generators, an automatic voltage regulator responsive to the voltage across the first-named generator for controlling the operation of the exciter, a second exciter disposed for operation to control the excitation of a second one of the generators, the second exciter having a pair of field windings, means for controlling the energization of one of the field windings for controlling the initial excitation of the second-named generator, means responsive to the power factor of the second-named generator disposed to control the energization of the other field winding of the second exciter, and means responsive to the power factor of the first-named generator disposed to cooperate with the power factor responsive means of the second-named generator to limit the functioning thereof whereby the excitation of the second-named generator is controlled to maintain balanced output between the generators.

2. A system for regulating the operation of parallel connected alternating-current generators, comprising, in combination, an exciter disposed for operation to control the excitation of a first one of the generators, an automatic voltage regulator responsive to the voltage across the first-named generator for controlling the operation of the exciter, a second exciter disposed for operation to control the excitation of a second one of the generators, the second exciter having a pair of field windings, means for controlling the energization of one of the field windings for controlling the initial excitation of the second-named generator, means including an electric valve disposed to connect the other field winding of the second exciter to be energized, the electric valve having a grid to be utilized for controlling the conductivity thereof, a grid circuit responsive to the power factor of the second-named generator for controlling the bias of the grid to control the energization of the other field winding, and means responsive to the power factor of the first-named generator disposed to cooperate in the grid bias-ing circuit of the electric valve to maintain the valve non-conducting under predetermined operating conditions whereby the excitation of the second-named generator is controlled to maintain balanced output between the generators.

3. A system for regulating the operation of parallel connected alternating-current generators, comprising, in combination, an exciter disposed for operation to control the excitation of a first one of the generators, an automatic voltage regulator responsive to the voltage across the first-named generator for controlling the operation of the exciter, a second exciter disposed for operation to control the excitation of a second one of the generators, the second exciter having a pair of field windings, means for controlling the energization of one of the field windings for controlling the initial excitation of the second-named generator, means including an electric valve disposed to connect the other field winding of the second exciter to a source of power, the electric valve having a grid to be utilized for controlling the conductivity thereof, means for applying a negative bias to the grid, means for rendering the grid positive in response to the phase angle of the second-named generator to control the energization of the other winding, the positive biasing means including an impulse transformer connected to be responsive to the flow of current from the second-named generator, and means responsive to the power factor of the first-named generator disposed to cooperate in the grid bias-ing circuit of the electric valve to maintain the valve non-conducting under predetermined operating conditions whereby the excitation of the second-named generator is controlled to maintain balanced output between the generators.

4. A system for regulating the operation of parallel connected alternating-current generators, comprising, in combination, an exciter disposed for operation to control the excitation of a first one of the generators, an automatic voltage regulator responsive to the voltage across the first-named generator for controlling the operation of the exciter, a second exciter disposed for operation to control the excitation of a second one of the generators, the second exciter having a pair of field windings, means for controlling the energization of one of the field windings for controlling the initial excitation of the second-named generator, means including an electric valve disposed to connect the other field winding of the second exciter to be energized, the electric valve having a grid to be utilized for controlling the conductivity thereof, a grid circuit responsive to the power factor of the second-named generator for controlling the bias of the grid to control the energization of the other field winding, a second electric valve connected to impress a negative bias on the grid of the first-named valve to render the first-named valve non-conducting when the second-named valve is rendered conducting ahead of the first-named valve, the second-named valve being responsive to the power factor of the first-named generator to control the negative bias impressed by the second-named valve on the grid of the first-named valve whereby the valves cooperate to control the excitation of the second-named generator to maintain balanced output between the parallel connected generators.

5. A system for regulating the operation of parallel connected alternating-current generators, comprising, in combination, an exciter disposed for operation to control the excitation of a first one of the generators, an automatic voltage regulator responsive to the voltage across the first-named generator for controlling the operation of the exciter, a second exciter disposed for operation to control the excitation of a second one of the generators, the second exciter having a pair of field windings disposed to be additive in their effect when energized, one of the field windings being connected to a constant source of power supply, an adjustable resistor connected in circuit relation with the one field winding for initially controlling the excitation of the second exciter, and an electric valve circuit connected to be responsive to the power factor of each of the generators for automatically controlling the energization of the other field winding of the second exciter and thereby control the excitation of the second-named generator to maintain balanced output between the parallel connected generators.

6. A system for regulating the operation of parallel connected alternating-current generators, comprising, in combination, an exciter disposed for operation to control the excitation of a first one of the generators, an automatic voltage regulator responsive to the voltage across the first-named generator for controlling the operation of the exciter, a second exciter disposed for operation to control the excitation of a second one of the generators, the second exciter having a pair of field windings disposed to be additive in their effect when energized, one of the field windings being connected to a constant source of power supply, an adjustable resistor connected in circuit relation with the one field winding for initially controlling the excitation of the second exciter, a plurality of electric valves having grids for controlling the energization of the other field winding of the second exciter, a first one of the valves being disposed to connect the other field winding to a source of power, a grid circuit responsive to the power factor of the second-named generator for controlling the bias on the grid of the first-named valve to render the first-named valve conducting, the second one of the valves having a grid biasing circuit responsive to the power factor of the first-named generator to control the output of the second-named valve, and means interconnecting the output of the second-named valve with the grid biasing circuit of the first-named valve whereby the second-named valve impresses a negative bias on the grid of the first-named valve to render it non-conducting when the second-named valve is rendered conducting ahead of the first-named valve, the electric valve thereby cooperating to control the excitation of the second-named generator to maintain balanced output between the generators.

HAROLD C. JENKS.